United States Patent Office 3,076,855
Patented Feb. 5, 1963

3,076,855
PREPARATION OF METHYLBENZOSUBERANE
Donald L. Crain and Howard A. Hartzfeld, Bartlesville, Okla., assignors to Phillips Petroleum Company, a corporation of Delaware
No Drawing. Filed Sept. 25, 1961, Ser. No. 140,191
15 Claims. (Cl. 260—666)

This invention relates to the preparation of methylbenzosuberane. In one aspect this invention relates to the preparation of methylbenzosuberane by dehydrogenation and isomerization of bicyclododecadiene hydrocarbons.

This application is a continuation-in-part of our copending application Serial No. 18,810, filed March 31, 1960, now Patent No. 3,009,001.

It has recently been disclosed by G. Wilke in Angew. Chem., 69, 397-8 (1957), that butadiene can be trimerized in 80 percent yield to trans, trans, cis-1,5,9-cyclododecatriene. This trimerization is carried out by means of a catalyst system comprising an organoaluminum such as triethylaluminum in conjunction with a metal halide such as titanium tetrachloride. The cyclictriene which is formed boils at 100–101° C. at 11 mm. Hg absolute pressure. Thus, this synthesis represents a method of preparing a 12-carbon compound from a compound of much lower molecular weight.

In accordance with the invention of said copending application we discovered that cyclotrienes prepared by trimerizing 1,3-butadiene, or related compounds such as isoprene and piperylene, can be isomerized to novel bicyclodienes. In one specific embodiment of the invention of said copending application, we discovered that trans, trans, cis-1,5,9-cyclododecatriene can be isomerized to novel bicyclododecadienes.

Broadly speaking, the present invention resides in the preparation of methylbenzosuberane compounds from said bicyclododecadienes.

An object of the present invention is to provide a process for the preparation of methylbenzosuberane compounds. Another object of the present invention is to provide a process for the preparation of 3-methylbenzosuberane. Another object of the present invention is to provide a process for the preparation of 4-methylbenzosuberane. Another object of the present invention is to provide a process for the preparation of mixtures of said 3-methylbenzosuberane and said 4-methylbenzosuberane. Other aspects, objects, and advantages of the invention will be apparent to those skilled in the art in view of this disclosure.

According to the invention of said copending application there were provided novel bicyclo hydrocarbons including bicyclo - [5.5.0]-1,7 - dodecadiene and bicyclo-[5.5.0]-$\Delta^{1,7}$,2-dodecadiene.

Further according to the invention of said copending application, there was provided a method of isomerizing a cyclotriene hydrocarbon to bicyclodiene hydrocarbons containing the same number of carbon atoms and hydrogen atoms as the starting cyclotriene hydrocarbon, which method comprises contacting said triene with an isomerization catalyst selected from the group consisting of alkali metal amides and alkaline earth metal amides in the presence of an amine solvent which is a solvent for both said triene and said isomerization catalyst.

According to the present invention, there is provided a process for the preparation of methylbenzosuberane, which process comprises: subjecting a bicyclododecadiene hydrocarbon having an empirical formula of $C_{12}H_{18}$ to dehydrogenation and isomerization conditions in a reaction zone in the presence of a dehydrogenation and isomerization catalyst; and recovering said methylbenzosuberane from the effluent from said reaction zone.

Any suitable dehydrogenation and isomerization catalyst can be employed in the practice of the present invention. Catalysts suitable for use in the practice of the present invention as dehydrogenation and isomerization catalysts include the oxides of chromium, molybdenum, tungsten, uranium, and vanadium supported on such supports as alumina, silica, magnesia, and the like. One presently preferred catalyst is a chromia-alumina catalyst containing about 20 weight percent of $Cr_2O_3$ and about 80 weight percent of alumina. Other catalysts which can be employed include those promoted with oxides of iron and oxides of alkali metals such as potassium. For example, one group of such catalysts are those containing from 1 to 30 weight percent $Fe_2O_3$, from 20 to 68 weight percent $Cr_2O_3$ and from 5 to 79 weight percent $K_2CO_3$. Other chromia catalysts which can be employed include those of Oberlin et al. 2,891,956, containing from 0.5 to 5 weight percent $Cr_2O_3$, from 15 to 30 weight percent $CaCO_3$, the remainder being $Fe_2O_3$. The catalysts disclosed by Pitzer 2,866,791, containing from 10 to 60 weight percent KF, from 0.2 to 20 weight percent $Cr_2O_3$, the balance being $Fe_2O_3$, can also be employed. These catalysts and other catalysts such as those disclosed by Wagner in 2,732,376 can be employed in the practice of the invention. Said catalysts can be activated, or reactivated, under the usual conditions, as for example, temperatures within the range of about 850 to 1300° F. with from 100 to 5000 volumes of air per volume of catalyst per hour.

In the practice of the present invention, a bicyclododecadiene hydrocarbon is subjected to dehydrogenation and isomerization conditions in the presence of a suitable dehydrogenation and isomerization catalyst, such as one of those named above. Thus, in one method for carrying out the present invention, said bicyclododecadiene hydrocarbon is contacted in the vapor phase in any suitable reaction vessel with a suitable dehydrogenation and isomerization catalyst, such as one of those named above. Said contacting can be conveniently carried out by passing the vapors of said hydrocarbon through a bed of said catalyst. While the specific reaction conditions will vary with the particular catalyst chosen, the temperatures employed are usually within the range of from 750 to 1300° F., preferably within the range of from 800 to 1000° F. The pressure in the reaction vessel during said contacting is usually in the range of from atmospheric to about 50 p.s.i.g. Substantially atmospheric pressures are usually preferred.

Said contacting of the bicyclododecadiene hydrocarbon and catalyst is usually carried out at a liquid hourly space velocity within the range of from 0.1 to 10, preferably from 0.025 to 5.0 liquid volumes of hydrocarbon per volume of catalyst per hour.

If desired, said contacting of the bicyclododecadiene hydrocarbon and catalyst can be carried out in the presence of a suitable inert gaseous diluent, e.g., nitrogen, steam, or other suitable diluent. However, some of the chromium containing catalysts are water sensitive and steam diluents should be used with care, if at all. The use of a steam or water vapor diluent is sometimes advantageous when employing supported oxides of molybdenum, tungsten, or vanadium to help prevent coke formation, particularly when the reaction is carried out in the upper end of the temperature range. When a dilutent such as steam is employed, the volume ratio of steam to hydrocarbon will generally range from 1 to 20, preferably from 5 to 15.

Suitable isomerization catalysts which can be employed in the practice of the invention of said copending application to prepare the starting materials for the present invention are the alkali metal amides and the alkaline earth metal amides. As used therein, unless otherwise specified, the term "alkali metals" refers to and includes sodium, potassium, lithium, rubidium, and cesium; and the term "alkaline earth metals" refers to and includes calcium, barium, and strontium.

Examples of isomerization catalysts which can be employed in the practice of the invention of said copending application can be represented by the following structural formulas:

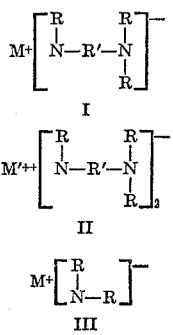

and

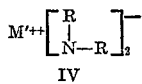

wherein: M is an alkali metal selected from the group consisting of sodium, potassium, lithium, rubidium, and cesium; M' is an alkaline earth metal selected from the group consisting of calcium, strontium, and barium; each R is selected from the group consisting of a hydrogen atom and alkyl radicals containing from 1 to 10 carbon atoms; and R' is selected from the group consisting of (a) alkylene radicals containing from 2 to 3 carbon atoms, (b) cycloalkylene radicals containing from 6 to 10 carbon atoms, and (c)

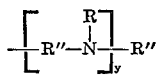

radicals wherein R is as defined above, R" is an alkylene radical containing from 2 to 3 carbon atoms, y is an integer of from 1 to 2, and wherein when R' is a cycloalkylene radical, only one amino nitrogen atom is attached to any one ring carbon atom.

Said isomerization catalysts employed in the practice of the invention of said copending application can be prepared by any suitable method known to those skilled in the art. A number of said catalysts are commonly prepared by the direct reaction of the desired metal with ammonia or a suitable primary or secondary amine. For example, the monoamide of lithium and ethylenediamine can be prepared by contacting metallic lithium with ethylenediamine, at a temperature such as about 30–115° C., for a period of time sufficient to obtain reaction of said metal with said amine, generally 1 to 5 hours. One example of the preparation of said monoamide of lithium and ethylenediamine is given in Example I below. The monoamides of potassium, rubidium, and cesium can be prepared in a manner similar to that for said monoamide of lithium and ethylenediamine. The amides of sodium, calcium, strontium, and barium of Formula I or II and the alkyl substituted amides of Formula III or IV can be prepared by the reaction of the desired amine with the inorganic amides, i.e., sodium amide, calcium amide, strontium amide, and barium amide, all of which compounds are available commercially or can be readily prepared by known methods. Said amide catalysts can be prepared in situ in the reaction vessel or they can be prepared ahead of time, stored until needed (preferably under an atmosphere of nitrogen), and then dissolved in the amine solvent to be employed in the isomerization reaction when needed. Examples of the metal amides which fall within the scope of the above general formulas are the lithium, potassium, sodium, rubidium, cesium, calcium, strontium and barium amides of the following amines, among others: ethane-1,2-diamine; propane-1,3-diamine; propane-1,2-diamine; cyclohexane-1,2-diamine; cyclohexane-1,4-diamine; 4 - methylcyclohexane - 1,2 - diamine; 5,6-diethylcyclohexane-1,3-diamine; 3 - n - butylcyclohexane-1,2-diamine; diethylenetriamine; dipropylenetriamine; triethylenetetramine; methylamine; diethylamine; n-propylamine; di-n-butylamine; di-n-hexylamine; sec-octylamine; and di-n-decylamine.

The monolithium amide of ethylenediamine is an example of an amide having the structure of the above Formula I. The monocalcium amide of ethylenediamine and the monocalcium amide of diethylene triamine are examples of metal amides having a structure like that of the above Formula II. Lithium amide and sodium amide are examples of metal amides having a structure like that of the above Formula III. Calcium amide is an example of a metal amide having a structure like that of the above Formula IV. The preferred amides for use in the practice of the invention of said copending application are those of sodium and lithium, lithium amides being the most preferred.

In the practice of the invention of said copending application, said isomerization catalysts are usually employed in a mol ratio of catalyst to cyclotriene being isomerized within the range of 0.05:1 to 20:1, preferably within the range of 0.1:1 to 10:1.

The isomerization reaction of the invention of said copending application is preferably carried out under essentially anhydrous conditions. The presence of small amounts of water can be tolerated. However, the presence of water in the reaction zone decreases the efficiency of the reaction because water reacts with the metal from which the metal amide catalysts are prepared, and also will react with the metal amides after they have been prepared. Thus it is preferred that the amines and other materials be essentially anhydrous.

The isomerization reaction of the invention of said copending application is carried out in the presence of an ammonia or an amine solvent or a mixture of said ammonia or amine solvent with another organic solvent. Said solvent or mixtures of solvents should be a solvent for both the isomerization catalyst and the cyclotriene compounds being isomerized. Preferred solvents are the amines mentioned herein. Said ammonia and amine solvents function as proton donors in the isomerization reaction and serve to cause said reaction to go farther toward completion. Thus, the amine solvent used in any particular isomerization reaction of the invention of said copending application is preferably at least as basic as the amine from which the metal amide catalyst employed in said reaction was prepared. In other words, and generally speaking, if said metal amide catalyst was prepared from a primary amine, then a primary amine solvent should be employed as the solvent media for carrying out the isomerization reaction. If the metal amide catalyst was prepared from a secondary amine, then either a secondary amine or a primary amine can be employed as the solvent media for carrying out the isomerization reaction. Thus, any suitable primary or secondary amine can be employed in the practice of the invention of said copending application. Generally speaking, the most preferred solvent in any situation is the amine from which the metal amide catalyst was prepared.

Included among the compounds which can be employed as solvents in the practice of the invention of said copending application are anhydrous ammonia, heterocyclic amines such as piperidine and morpholine, and amines represented by the following formulas

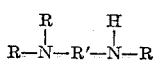

and

wherein each R and R' are as defined above in connection with said metal amide catalysts. Some examples of compounds of the above general formulas which can be employed are: ethylenediamine; N,N-dimethylethylenediamine; N,N,N'-trimethylethylenediamine; N,N'-di-n-pentylethylenediamine; N,N,N'-tri-n-heptylpropane-1,3-diamine; N,N'-di-n-decylpropane-1,2-diamine; N-sec-butyldiethylenetriamine; N,N-dimethylcyclohexane-1,4-diamine; N,N,N'-triethylcyclohexane-1,3-diamine; methylamine; diethylamine; di-n-propylamine; n-hexylamine; di-sec-heptylamine; tert-octylamine; n-decylamine; and the like. It is to be understood that ammonia and the amines named above in connection with the metal amide catalysts also come within the scope of the above general solvent formulas and can be employed as solvents. It is also to be understood that ammonia and the amines set forth above as solvents can also be used to prepare said metal amide catalysts.

The amount of said ammonia or amine solvent employed in the practice of the invention of said copending application is an amount sufficient to give an ammonia or amine to cyclictriene mol ratio within the range of about 1:1 to about 20:1, preferably 3:1 to 6:1.

In addition to said ammonia or amine solvent there can also be present in the reaction zone, as a part of the media in which the isomerization reaction is carried out, an additional organic solvent. Said additional organic solvent can be any solvent which is a solvent for the metal amide catalyst and the cyclotriene compound being isomerized and which is chemically inert under the reaction conditions. Included among the suitable additional solvents are the tertiary amines of from 3 to 12 carbon atoms and saturated cyclic and acyclic ethers, including mono-ethers and polyethers, containing from 2 to 20 carbon atoms per molecule. Examples of suitable additional solvents which can be employed in the practice of the invention include, among others, the following: pyridine, N-methylpiperidine, dimethylaniline, trimethylamine, tri-n-butylamine, dicyclohexyl ether, diethyl ether of diethylene glycol, dibutyl ether of ethylene glycol, dimethyl ether of diethylene glycol, N-methylmorpholine, m-dioxane, p-dioxane, tetrahydrofuran, tetrahydropyran, and ethers characterized by the formula $R_1—O—R_1$ wherein each $R_1$ is an alkyl radical containing from 1 to 10 carbon atoms. Examples of ethers characterized by the above formula include, among others, the following: dimethyl ether, diethyl ether; di-n-butyl ether; diisopropyl ether; di-n-hexyl ether; and di-n-decyl ether.

When employed, said additional organic solvent is employed in an amount sufficient to give an organic solvent to ammonia or amine solvent volume ratio within the range of 3:1 to 10:1.

The isomerization reaction of the invention of said copending application is generally carried out at a temperature within the range of 20 to 200° C., preferably 90 to 150° C. The reaction time will be governed by such factors as catalyst ratio, and temperature but will generally be in the range of 10 minutes to 24 hours, more generally in the range of 2 to 18 hours. The reaction is carried out under liquid phase conditions, in many instances at atmospheric pressure; however, superatmospheric pressures can be employed to maintain said liquid phase conditions if necessary.

Trans, trans, cis-1,5,9-cyclododecatriene has the following structural formula

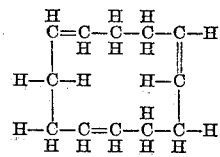

The isomerization of trans, trans, cis-1,5,9-cyclododecatriene in accordance with the invention of said copending application results in the formation of two 12-carbon bicyclic hydrocarbon isomers containing two conjugated carbon to carbon double bonds. These isomers have the following structural formulas designated below as A and B.

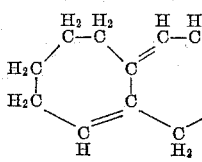 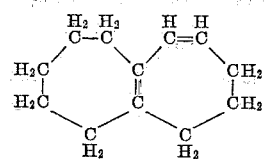

A
Bicyclo-[5.5.0]-1,7-dodecadiene

B
Bicyclo-[5.5.0]-Δ$^{1,7}$,2-dodecadiene

For convenience, said compounds will be referred to hereinafter as isomers or compounds A and B.

The novel bicyclodienes of the invention of said copending application have utility in areas where similar compounds such as tetralin (tetrahydronaphthalene) and decalin (decahydronaphthalene) are employed. This includes such areas as paint and lacquer solvents and thinners, and liquid absorbents for the recovery of vapors of organic compounds such as benzene, ethyl alcohol, ethyl acetate, and acetone.

In accordance with the present invention, said bicyclicdienes A and B can be converted by dehydrogenation and isomerization to methylbenzosuberanes which have utility as paint and lacquer solvents and thinners, and as musk odorants. The structural formulas for said methylbenzosuberanes are

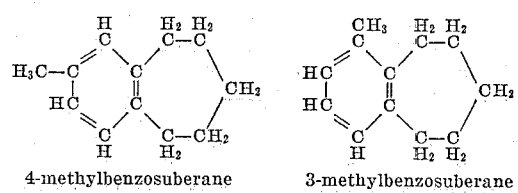

4-methylbenzosuberane     3-methylbenzosuberane

In one presently preferred method for carrying out the isomerization reaction of the invention of said copending application, the metal amide isomerization catalyst is prepared in situ. For example, ethylenediamine is purified by refluxing with sodium metal, followed by fractional distillation from the sodium to give an anhydrous amine. A metal such as lithium is cut into small pieces, added to said purified ethylenediamine, and the mixture refluxed for a period of time sufficient to insure complete reaction of all the metal. To the solution of the metal amide catalyst thus prepared there is then added, slowly, the cyclotriene compound to be isomerized. The resulting mixture is then maintained at the desired temperature, with stirring, for the desired reaction time. The isomerizate, comprising bicyclodiene compounds, is then recovered from the resulting reaction mixture.

In another method, the metal amide isomerization catalyst is formed in situ in the presence of an ether solvent. In this method, the ether, e.g., anhydrous n-butyl ether; the metal, e.g., lithium and the amine, e.g., anhydrous ethylenediamine, are charged to a reaction vessel and refluxed at a suitable temperature for a suitable length of time to insure complete reaction of said metal with said amine. The cyclotriene compound to be isomerized is then charged to said reaction vessel, the reaction is carried out as described above, and the resulting bicyclodiene compounds are recovered from the resulting reaction mixture.

In still another method, which is advantageously employed when the metal amide catalyst is prepared by the reaction of the metal amide with the amine, a slurry of the metal amide, e.g., sodium amide, in a dry low boiling hydrocarbon, e.g., normal pentane, is added to a reaction vessel and a suitable amount of anhydrous amine, e.g., ethylenediamine, is slowly added to said slurry with stirring. The resulting mixture is then stirred at a suitable temperature for a suitable period of time to insure formation of the catalyst. The cyclotriene to be isomerized is then slowly added to the thus formed solution of catalyst, the reaction carried out as above described, and the resulting bicyclodiene compounds recovered from the reaction mixture.

The following examples will serve to further illustrate the preparation of said bicyclicdienes A and B which are starting materials for the present invention.

EXAMPLE I

Ethylenediamine (98–100%) was purified by refluxing over sodium, with subsequent fractional distillation. To 750 ml. of this purified amine in a 2-liter three-necked flask equipped with stirrer, thermometer, stoppered straight condenser, and spiral condenser with nitrogen inlet and mercury sealed outlet, there was added (through the straight condenser) at 90–100° C., over a period of 100 minutes, 34.7 g. (5.0 g. atoms) of metallic lithium cut into small pieces. The mixture was stirred at 90–100° C. for 2 hours to insure complete reaction of the lithium with the amine. The straight condenser was then replaced with a dropping funnel containing 81.2 g. (0.50 mol) of 1,5,9-cyclododecatriene (B.P. 96.5–97° C. at 7 mm. Hg). The triene was added over a period of 8 minutes to the stirred reaction mixture maintained at 96–98° C. The resulting dark red solution was stirred at 96–98° C. for 1 hour. The solution was then cooled in an ice bath to about room temperature, and the partially solidified mixture was hydrolyzed with 2500 ml. of water. An oil phase separated. The mixture was then extracted with three 400-ml. portions of ether, and the combined ether extracts were dried over anhydrous sodium sulfate. After removal of ether, the product was flash distilled to give 77.1 g. of orange colored liquid boiling over the range from 101° C. at 8.2 mm. Hg to 250° C. at 0.5 mm. Hg. An ether solution of this distillate was extracted with 10% hydrochloric acid and washed wtih water, then with 5% sodium hydroxide. This ether solution of neutral substances was dried over sodium sulfate.

From the dried ether solution of neutral substances there were obtained by distillation the following four fractions:

| Fraction | Boiling Range | Grams | Refractive Index ($n_D^{20}$) |
|---|---|---|---|
| 1 | 83° C./7.9 mm.–96° C./8.0 mm. Hg | 6.0 | 1.5105 |
| 2 | 96–97.5° C./8.0 mm. Hg | 7.7 | 1.5225 |
| 3 | 97.5° C./8.0 mm.–99.5° C./7.6 mm. Hg | 31.2 | 1.5253 |
| 4 | 99.5–100.5° C./7.6 mm. Hg | 5.2 | 1.5268 |

In addition, there was obtained 2.7 g. of material distilling over the range 87–184° C./0.23–0.26 mm.

*Analysis of fraction 3.*—Calculated for $C_{12}H_{18}$: C, 88.8; H, 11.2. Found: C, 88.3, 88.0; H, 10.9, 10.8.

The mass spectrum of fraction 3 showed a parent peak at 162. The ultra-violet spectrum indicated the presence of conjugated double bonds. Gas chromatographic analysis revealed the presence of two components in a ratio of approximately 22:78. Infrared analysis indicated the absence of methyl and vinyl groups. Quantitative hydrogenation in acetic acid at room temperature and atmospheric pressure, with reduced platinum oxide as catalyst, gave a value of 1.96 double bonds per molecule. Hydrogenation of this bicyclic diene mixture in a Parr hydrogenator gave as a product a single saturated substance (as determined by gas chromatography) having the following properties, B.P. 106° C./9.1 mm.–107° C./9.2 mm., $n_D^{20}$ 1.4901. Thus, this is proof that compounds A and B are isomers having the same carbon skeleton.

*Analysis of hydrogenated product.*—Calculated for $C_{12}H_{22}$: C, 86.66; H, 13.33. Found: C, 86.57, 86.63; H, 13.42, 13.36.

EXAMPLE II

Another run was carried out by the procedure of the preceding example. In this run, the ingredients charged consisted of 100 ml. of anhydrous dibutyl ether, 35 ml. of anhydrous ethylenediamine and 1.7 grams (0.24 mol) of metallic lithium. After refluxing these materials together for four hours, 91.9 grams (0.567 mol) of trans, trans, cis-1,5,9-cyclododecatriene was added drop-wise. After refluxing for 18 hours with stirring, the reaction mixture was cooled to about room temperature, and a solid separated. The mixture was then added to water and an organic phase separated, the organic phase was extracted with ethyl ether, and the extract was acidified with sulfuric acid to break the emulsion which formed. The combined organic extracts were then washed with acid, followed by a water wash, and were then dried over anhydrous sodium sulfate. The ether was removed by distillation, and the residue was then fractionated. Three of the thirteen fractions from this fractionation were subjected to gas chromatographic analysis. Cut No. 4 boiled at 98° C./8.2 mm. Hg, has a refractive index of 1.5208 @ 20° C., and amounted to three grams. Cuts 10 and 12 boiled at 98–100° C. at 7.5 mm. Hg and 100° C. at essentially 7.5 mm. Hg respectively, amounted to 32.3 and 5.1 grams respectively, and had respective refractive indices of 1.5256 and 1.5301. Gas chromatographic analyses indicated the presence of cyclododecatriene and two other close boiling materials in the first cut, while the second and third cuts contained only the 2 close boiling materials. The following table lists the contents of these fractionation cuts as determined by said analyses.

*Table*

| Cut | Weight percent cyclododecatriene | Weight percent compound A | Weight percent compound B |
|---|---|---|---|
| 4 | 8.5 | 35.8 | 55.7 |
| 10 |  | 32.0 | 68.0 |
| 12 |  | 9.5 | 90.5 |

In a quantitative hydrogenation of 0.0821 gram of cut No. 3 over platinum catalyst in acetic acid at 25° C. and 739 mm. Hg, 26.6 ml. of hydrogen were absorbed. This is equivalent to 2.00 double bonds.

Ultraviolet analysis of cut 12 showed the material, mostly compound B, to be a conjugated diene. The maximum absorption appeared at 248 m$\mu$, and the extinction coefficient $\epsilon$ was approximately 10,000.

A 0.1742 gram sample of cut No. 10 from Example II was dissolved in glacial acetic acid and then quantitatively hydrogenated over a reduced platinum catalyst at 22.4° C. and at a pressure of 740 millimeters of mercury. During said hydrogenation 49.8 milliliters of hydrogen were absorbed, indicating the presence of 1.96 carbon to carbon double bonds.

EXAMPLE III

Another run was carried out in which trans, trans, cis-1,5,9-cyclododecatriene was isomerized in the presence of the monolithium salt of ethylenediamine. In this run, n-butylamine was dried by refluxing over metallic sodium, after which the amine was purified by fractional distillation. A 3-necked flask (500 ml.), fitted with a stirrer, a condenser, an addition funnel and a nitrogen inlet tube was flushed with prepurified nitrogen, after which 100 ml. of said purified amine was charged to the flask. 1.4 grams (0.2 mol) of metallic lithium was cut into small pieces and charged to the flask. The resulting mixture was stirred at refluxing temperature for four hours, after which 15 ml. of anhydrous ethylenediamine was added. The solution turned a deep blue color and hydrogen slowly evolved. The mixture was then allowed to cool and stand overnight, following which it was again heated and stirred and refluxed until the blue color disappeared. At this time, 31.9 grams (0.19 mol) of said cyclododecatriene was added drop-wise over a two-hour period while stirring and refluxing the solution. The solution turned red, then darker and finally almost black. Following completion of the addition of cyclododecatriene, the solution was stirred for an additional two hours.

The solution was then cooled to about room temperature, and water was carefully added to hydrolyze the lithium salt. The aqueous mixture was then extracted with n-pentane, the combined pentane extracts were washed with water, and the water layers were combined. The pentane solution was then washed with 10–20 weight percent $H_2SO_4$ until the extracts were acidic. The organic phase was then washed with sodium bicarbonate solution and with water and then dried over anhydrous sodium sulfate. The pentane was then distilled off and the bright yellow, clear, residual oil was fractionated at reduced pressure. Results of this fractionation are given in the following table.

*Table*

FRACTIONATION

| Cut | Boiling Range, °C. | Pressure, mm. mercury | Grams | Refractive Index |
| --- | --- | --- | --- | --- |
| 1 | 97–98.2 | 7.5 | 1.1 | 1.5172 |
| 2 | 98.2–99 | 7.8 | 6.2 | 1.5179 |
| 3 | 99–99.5 | 7.7 | 10.7 | 1.5201 |
| 4 | 99.5–100 | 7.7 | 5.0 | 1.5221 |
| 5 | 100 | 7.7 | 3.2 | 1.5251 |
| Residue | | | 0.4 | |

Portions of cuts 2 and 4 from the above fractionation were submitted for analysis by gas chromatography. Both cuts contained the diene products A and B as well as the starting material, cyclododecatriene. A portion of cut 2 was hydrogenated in glacial acetic using a reduced platinum oxide catalyst, a temperature of 26° C., a pressure of 740 mm. Hg absolute, and a reaction time of 20 minutes. A total of 61.7 ml. of hydrogen was absorbed, which was calculated to be 2.41 double bonds. Thus, said cut 2 contained 41 percent by weight cyclododecatriene starting material and 59 percent by weight of the dienes A and B.

The following examples will serve to further illustrate the preparation of methylbenzosuberanes from said bicyclic dienes A and B in accordance with the present invention.

EXAMPLE IV

A run was carried out in which a sample of a mixture of bicyclicidienes A and B was dehydrogenated and isomerized with a chromia-alumina catalyst. In this run, 16.4 grams of a mixture of said bicyclicdienes prepared by a procedure essentially identical to those of the previous examples was dehydrogenated and isomerized over a 20% chromia-80% alumina catalyst bed at 500° C. The sample of bicyclicdienes before conversion had a boiling point of 99–99.5 at 7.5 mm. mercury absolute and a refractive index $n_D^{20}$ of 1.5255. The run was carried out in a reaction vessel comprising a glass tube of approximately 16 millimeters inside diameter. Said tube was closed at the top, fitted with a side inlet, a thermowell inlet, and a bottom outlet. Approximately 25 milliliters of the chromia-alumina catalyst was charged to said tube to form a bed of catalyst approximately 4.5 to 5 inches deep, said bed of catalyst being positioned below said side inlet. The thus charged tube was then mounted in a furnace and heated to about 932° F. and a slow stream of air was passed through the tube to activate and dry the catalyst. Said catalyst was considered to be activated and dried when no further water was given off. Said catalyst contained 20 weight percent $Cr_2O_3$ and 80 weight percent alumina, and was formed into 1/8 inch pills. This catalyst had a surface area of 59.6 square meters per gram, a bulk density of 1.76 grams per cc., a pore volume of 0.29 cc./gram, and an average pore diameter of 195 Angstroms.

After the catalyst had been activated and dried with air as described, the air was shut off and said mixture of bicyclicdienes A and B was introduced dropwise into the heated tube through said side inlet tube at the rate of approximately 10 drops per minute to give a calculated liquid hourly space velocity of 1.2. The liquid vaporized immediately upon entering the tube. The outlet tube of the reaction vessel was connected to a receiver which was cooled by means of a Dry Ice-chloroform-carbon tetrachloride bath. Following the conversion, the product in said receiver was fractionated on a spinning band Podbielniak column. The following table gives the results of this fractionation.

*Table*

| Cut | Boiling point, °C. | Pressure, mm. mercury absolute | Grams | $n_D^{20}$ |
| --- | --- | --- | --- | --- |
| 1 | 61–91 | 8.0–7.8 | 1.0 | 1.5275 |
| 2 | 91–100 | 8.6–8.5 | 2.3 | 1.5350 |
| 3 | 100–104 | 8.9–8.7 | 1.7 | 1.5459 |
| 4 | 104–106 | 8.7 | 4.8 | 1.5542 |
| 5 | 106 | 8.6–0.5 | 2.5 | 1.5810 |
| Residue | | | 2.0 | |

Infrared analyses of cuts 2, 3, 4, and 5 were carried out. The spectrum of cut 4 showed bands common to 3- and 4-methylbenzosuberanes. Said cut 4 contained 58.4 weight percent of 4-methylbenzosuberane and 20.3 weight percent of 3-methylbenzosuberane, the remainder being unidentified hydrocarbons, as determined by gas chromatography. Since a dehydrogenation and isomerization of cycloheptane yields toluene, then the cyclicdienes A and B are a mixture of isomers, each having a bicyclo-[5.5.0]-dodecane skeleton.

Based on the infrared analyses, mass spectrometer analyses, the dehydrogenation and isomerization and all of the measured chemical and physical properties, the two isomers have the formulas A and B shown above.

EXAMPLE V

A series of syntheses were carried out by which methylbenzosuberane was prepared and subsequently compared to the dehydrogenation and isomerization product of Example IV.

A mixture of glutaric anhydride (77.5 grams, 0.68 mol) and 350 ml. of toluene was stirred at room temperature in a one-liter, three-necked flask equipped with a stirrer and a condenser. Anhydrous aluminum chloride (178 grams, 1.34 mol) was added in one portion. The resulting reaction was highly exothermic, and HCl gas was rapidly evolved. The mixture turned dark and was stirred at 80–100° C. for 1.5 hours. After cooling the mixture to 0° C. in an ice bath, a solution which was prepared by mixing 100 ml. of concentrated hydrochloric acid and 100 ml. of water was added slowly. After the acid had been added, the viscous mixture was steam distilled to remove the toluene and to complete the hydrolysis of the aluminum compounds. The resulting mixture was then cooled to 0° C. and filtered by suction. The solid present was then dissolved by boiling in an aqueous solution of sodium carbonate which was prepared by dissolving 100 grams $Na_2CO_3$ in 200 ml. water. The undissolved solid which remained was filtered from the hot solution and washed with hot water. Careful acidification of the clear filtrate with hydrochloric acid caused the product to precipitate. The product, p-methylbenzoylbutyric acid, was filtered and air dried overnight. The total weight of yellow solid which was recovered was 113 grams, representing an 80.7% yield. After recrystallization from benzene, the product melted at 152–4° C.

The p-methylbenzoylbutyric acid which was prepared by the above-described procedure was converted to 5-p-tolylvaleric acid in the following manner. Thirty-three grams (0.16 mol) of p-methylbenzoylbutyric acid, 25.6 grams (0.64 mol) of sodium hydroxide and 25 ml. of hydrazine hydrate in 150 ml. of triethylene glycol was refluxed for one hour in a 300 ml. round-bottomed flask equipped with a condenser. The condenser was then removed, and the solution was distilled until the pot temperature reached 195° C. The condenser was then replaced, and the solution was then refluxed an additional three hours. Upon cooling to room temperature, the contents of the flask solidified. The entire mixture was dissolved in water, and the solution was carefully acidified with hydrochloric acid. A light yellow solid product precipitated from the solution, and after filtration, was pressed dry. The air dried product, 5-p-tolylvaleric acid, was dissolved in cyclohexane, and the excess water was separated off. Azeotropic distillation removed the last traces of water. Upon cooling the cyclohexane solution, the product crystallized out. An additional 3.9 grams was recovered from the mother liquors. A total yield of 93.1% of 5-p-tolylvaleric acid, melting point 78–9° C., was obtained.

The 5-p-tolylvaleric acid was then ring closed to form 5H-2-methyl-5,6,7,8-tetrahydro-9-benzocycloheptanone in the following manner. Polyphosphoric acid was prepared by dissolving 306 grams of $P_2O_5$ in 195 cc. of 85% by weight phosphoric acid and then heating the resulting mixture on a steam bath for 3 hours with occasional stirring. This polyphosphoric acid was then used in the ring closure synthesis step, this step being essentially the same as that outlined by C. L. Anderson et al., Journal of American Chemical Society, 77, 598 (1955). The polyphosphoric acid as prepared above was charged to a 500 ml. Erlenmeyer flask, and to this acid was added 24.7 grams (0.128 mol) of the 5-p-tolylvaleric acid which was prepared as described above. The resulting mixture was then heated on a steam bath for 2 hours, after which the reaction mixture was allowed to stand overnight (14 hours) at room temperature. The mixture was then poured onto crushed ice, and the resulting product was extracted with pentane. The combined pentane extracts were washed with an aqueous sodium carbonate solution, after which the hydrocarbon phase was dried over anhydrous sodium sulfate. The pentane was then stripped off, leaving a light yellow oil (21.2 grams). This yellow oil was then fractionated at reduced pressure. Results of the fractionation were as follows:

FRACTIONATION

| Cut | Boiling Point, °C. | Pressure, mm. Mercury Absolute | Volume (ml.) | Grams | $n_D^{20}$ |
| --- | --- | --- | --- | --- | --- |
| 1 | 123–3.5 | 1.1 | 14.2 | 14.4 | 1.5585 |
| 2 | 123.5 | 1.1 | 3.5 | 3.5 | 1.5586 |
| 3 | 123.5+ | 1.1–0.5 | 1.6 | 1.6 | 1.5587 |

The total yield was 19.5 grams, representing an 87.4% yield. The measured density of cut 2 at 20° C. was 1.0290. The semicarbazone of cut 1 melted at 197.5–8° C.

The 5H - 2-methyl-5,6,7,8-tetrahydro-9-benzocycloheptanone was then converted to 4-methylbenzosuberane by the following procedure. A solution consisting of 15.4 grams of cuts 1 and 3 from the above fractionation, 10.2 grams of sodium hydroxide and 15 ml. of hydrazine hydrate in 70 ml. of triethylene glycol was refluxed for one hour in a 300 ml. round-bottomed flask equipped with a condenser. The condenser was then replaced by a vapor line passing to a receiver. The solution was then distilled, and the condensate collected, until the pot temperature reached 195° C. The solution was then refluxed for an additional 2.5 hours, after which the solution was allowed to cool to room temperature. Both the collected condensate and the remaining mixture in the pot were poured into water and extracted with pentane. The combined extracts were then dried over anhydrous sodium sulfate, after which the pentane was distilled off. Fractionation at reduced pressure gave 2 cuts. Cut 1 boiled at 98° C. at 6.1 mm. mercury absolute pressure, and amounted to 8.8 grams (9.3 ml.). This cut had a refractive index $n_D^{20}$ of 1.5366. The second cut boiled at 98° C. at 6.1–1.0 mm. mercury absolute pressure, and amounted to 3.7 grams (4.0 ml.). This material had a refractive index of 1.5368 ($n_D^{20}$). The total recovered amount, 11.5 grams, represents a yield of 81%.

The infrared spectrum of the last-mentioned cut 1 was identical to that of the spectrum reported in the literature for 4-methylbenzosuberane. The retention time of said last-mentioned cut 1 in gas chromatography was identical to the retention time of the major component in cut 4 of the dehydrogenation and isomerization mixture of Example IV. Both the infrared spectrum and gas chromatographic results confirm the formation of 4-methylbenzosuberane when the bicyclicdiene mixture is dehydrogenated and isomerized as described in Example IV.

The compounds synthesized above were subjected to elemental analyses. The results were:

5-p-tolylvaleric acid: Calculated for $C_{12}H_{16}O_2$.—C, 75.0 wt. percent; H, 8.3 wt. percent. Found: C, 75.0 wt. percent; H, 8.5 wt. percent.

Cut 2 of the benzocycloheptanone: Calculated for $C_{12}H_{14}O$.—C, 82.8 wt. percent; H, 8.0 wt. percent. Found: C, 82.7 wt. percent; H, 8.4 wt. percent.

Semicarbazone of cut 2 of the benzocycloheptanone: Calculated for $C_{13}H_{17}N_3O$.—C, 67.5 wt. percent; H, 7.4 wt. percent. Found: C, 67.3 wt. percent; H, 7.9 wt. percent.

4-methylbenzosuberane: Calculated for $C_{12}H_{16}$.—C, 89.9 wt. percent; H, 10.1 wt. percent. Found: C, 89.5 wt. percent; H, 10.0 wt. percent.

The following examples will serve to further illustrate the preparation and properties of said isomeric bicyclodienes A and B of said copending application, which bicyclodienes are the starting materials for the process of the present invention.

EXAMPLE VI

Another run was carried out in which trans, trans, cis-1,5,9-cyclododecatriene was isomerized by the procedure of Example I.

In this run, 31.6 grams (0.198 mol) of said cyclododecatriene was added drop-wise over a two hour period to a mixture of 100 ml. of di-n-butyl ether and 25 ml. of anhydrous ethylenediamine to which had been added 1.4 gram (0.2 mol) of lithium metal at 108° C., followed by stirring at 108° C. until all of the lithium had reacted. The temperature of the reaction mixture during addition of the cyclododecatriene was 106° C.

After the drop-wise addition of the cyclododecatriene had been completed, the resulting mixture was stirred at reflux for 3 hours, after which it was allowed to cool to room temperature and stand overnight (15 hours) under a nitrogen blanket. At the end of this time, the mixture was again heated to reflux (106° C.) and maintained at this temperature for 6.5 hours. The mixture was then cooled to about room temperature and water added. The product was then worked up as in Example I. The organic material was distilled at reduced pressure and a cut which boiled at 100.5–101.5° C. @ 8.5 mm. Hg absolute pressure was employed in the following manner.

A solution of 12.7 grams of the isomerized material from the above fractionation cut and 9.8 grams of maleic anhydride in 50 ml. of benzene was refluxed for 15 hours in a round-bottomed flask equipped with a condenser and a drying tube. After the benzene solution was cooled to room temperature, 50 ml. of 20% by weight aqueous sodium hydroxide was added to the solution, and the resulting mixture was shaken. A "solid" separated, and the slurry was then poured into a 500 ml. flask. Three hundred milliliters of n-pentane and 100 ml. of water were then added to the mixture, and the resulting mixture was stirred with a magnetic stirring bar. After three hours of stirring, the mixture was filtered.

The "solid" was actually an emulsion which could be partially broken with water. The entire "solid" mixture was then placed in a separatory funnel and extracted with water. After each period of shaking, the mixture had to stand for about 15 minutes before the water layer would separate. The pentane-benzene layer was an emulsion. After 5 extractions with 100 ml. portions of water, the fifth mixture was allowed to settle, and most of the water was drained off. The remaining emulsion was dried over a large excess of anhydrous sodium sulfate until the hydrocarbon layer clearly separated.

The pentane and benzene were then distilled off, and the residue was then distilled under reduced pressure. A total of 4.0 grams of colorless liquid was obtained, B.P. 96.5–97° C. @ 7.5 mm. Hg absolute pressure. The refractive index of this material was $n_D^{20}=1.5255$.

Gas chromatographic analysis of this material showed the presence of both isomers, the mixture containing 77 wt. percent of isomer A and 20 wt. percent of isomer B. Prior to treatment with maleic anhydride, the weight ratio of isomer B to isomer A was approximately 2:1.

While this run does not show complete separation of the isomers, it does show that mixtures can be concentrated with respect to one isomer by treatment with maleic anhydride.

The two isomers A and B can also be separated by fractionation employing a very efficient fractionation column such as a spinning band column and precise operating conditions normally employed for the separation of close boiling materials. However, in the practice of the present invention there is little, if any, advantage in doing so because each of said isomers A and B is apparently capable of being dehydrogenated and isomerized to both 3-methylbenzosuberane and 4-methylbenzosuberane. Thus, in the practice of the present invention, it is preferred for practical reasons to subject a mixture of said isomers A and B to dehydrogenation and isomerization conditions and recover the individual 3-methylbenzosuberane and 4-methylbenzosuberane from the resulting reaction mixture. This can be done by efficient fractionation means as described above or gas chromatography means, as will be understood by those skilled in the art.

EXAMPLE VII

A run was carried out in which trans, trans, cis-1,5,9-cyclododecatriene was isomerized in the presence of the monoamide of sodium and ethylenediamine.

In this run, an apparatus similar to that of Example I and consisting of a 300 ml. three-necked flask equipped with an addition funnel, nitrogen inlet, stirrer, and condenser was employed. The amide was generated in situ in the following manner.

A slurry of 14.7 grams (0.377 mol) of sodium amide in 50 ml. of dry n-pentane was charged to the flask and 90 ml. of anhydrous ethylenediamine which had been previously purified by refluxing with sodium, followed by fractionation from sodium, was then added to the slurry while stirring over a period of 5 minutes. The mixture turned deep purple in color and ammonia was slowly evolved. Upon heating the stirred mixture to reflux, ammonia was evolved at a moderate rate.

The pentane was then removed by passing nitrogen through the flask. The mixture was then stirred at approximately 95° C. for two hours at which time 42.5 grams of said cyclododecatriene (0.262 mol) was added over a 15 minute period. The resulting dark mixture was then stirred at reflux for 45 minutes. After cooling the mixture to room temperature, water was cautiously added to the mixture while stirring. The resulting mixture was then extracted with pentane, following which the combined extracts were washed with water. The organic layer from the extraction was then washed with saturated aqueous $NaHCO_3$ solution, then with water, after which it was dried over sodium sulfate.

The pentane was then distilled off, and the residue, a yellow oil amounting to 14.3 grams was then fractionated at reduced pressure. The results of this fractionation were as follows:

FRACTIONATION

| Cut | B.P., °C. | Pressure, mm. Hg Abs. | Grams | Refractive Index, $n_D^{20}$ |
| --- | --- | --- | --- | --- |
| 1 | 70–73 | 3 | 0.8 | 1.5145 |
| 2 | 73–75 | 2.5 | 4.7 | 1.5215 |
| 3 | 75–68 | 2.5–1.0 | 5.2 | 1.5236 |
| Total | | | 10.7 | |
| Pot Residue | | | 3.4 | |

Infrared spectra of cuts 2 and 3 were almost identical to the spectra of the bicyclicdienes from the isomerization with lithium amide catalysts (Example I).

This run shows that amides of alkali metals other than lithium can be employed in the isomerization process of the invention of said copending application.

EXAMPLE VIII

A sample of one of the fractionation cuts of isomerized product from Example II which boiled at 100+° C. at essentially 7.5 mm. Hg absolute and had a refractive index $n_D^{20}$ of 1.5301 (cut No. 12) and a sample of the product from Example VI were examined by nuclear magnetic resonance, using their proton spectra for structure determination. The two samples which were examined had the following analyses by gas chromatography.

| | Wt. Percent Isomer A | Wt. Percent Isomer B | Wt. Percent Cyclododecatriene (Starting Material) |
| --- | --- | --- | --- |
| Sample from Example II | 9.5 | 90.5 | |
| Sample from Example VII | 77 | 20 | ~3 |

The following results were obtained from the nuclear magnetic resonance spectra.

The ratio of aliphatic protons to vinylic protons for the sample from Example II was 7.3:1, while the ratio for the sample from Example VI was 8.3:1. Since the isomers both have the formula $C_{12}H_{18}$, the possible ratios of aliphatic to vinylic protons would be 17:1, 16:2, 15:3, 14:4, which reduces to 17:1, 8:1, 5:1, and 3.5:1. Thus, the experimental values are in agreement with 8:1, and there are, therefore, 2 vinylic protons in each of both isomers.

As shown in Examples I–IV, both isomers are bicyclo-[5.5.0] dodecadienes. The fact that the nuclear magnetic spectra show 2 vinylic protons in each isomer is further evidence that the two dienes are simple ring-fused structures since this eliminates all bridged compounds. It is not possible to have only 2 vinylic protons in such bridged structures without locating both double bonds at the bridgehead carbon atoms, a situation which has been shown to be highly improbable (Bredt's Rule). See Advanced Organic Chemistry, G. W. Wheland, second edition, John Wiley and Sons, Inc., New York (1954). Thus, the bicyclic ring systems which are possible are (5,9), (6,8), (7,7), (10,4), and (11,3). The latter two are extremely unlikely.

Higher resolution of the vinyl proton region of the spectrum was also carried out. The sample from Example II, substantially all isomer B, revealed a sextuplet which is consistent with a methylene group adjacent to a double bond with 2 vinyl protons, i.e.

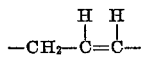

Thus, in order to place the second double bond in conjunction with the double bond and not increase the number of vinyl protons (since a total of two are present), it is necessary for this second double bond to be located between the two ring fusion carbons. Thus, the double bonds in isomer B are located as follows:

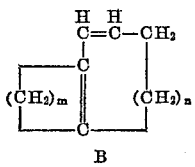

B

In this formula, $m$ and $n$ are whole integers. Since we have already shown in Example IV that dehydrogenation and isomerization of the isomers produces methylbenzosuberanes, thus proving that the rings each contain seven carbons, and the ring system is [5.5.0], the structure for isomer B is thus:

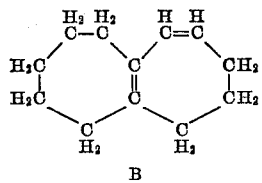

B
Bicyclo [5.5.0]-$\Delta^{1,7}$,2-dodecadiene

The vinyl region of the spectrum of the sample from Example VI, predominantly isomer A, was much different from that of isomer B in that a triplet was observed. This type of spectrum is consistent with vinyl protons symmetrically located within the molecule.

Considering these results with the analytical results given in the other examples, particularly the maleic anhydride adduct in Example VI, it is concluded that the structure of isomer A is

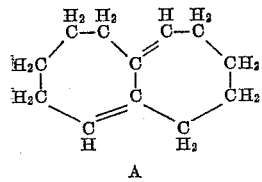

A
Bicyclo [5.5.0]-1,7-dodecadiene

While the preparation of said isomers A and B in accordance with the invention of our said copending application has been described above with particular reference to obtaining said isomers by isomerization of trans, trans, cis-1,5,9-cyclododecatriene, it is also within the scope of said invention to isomerize trans, trans, trans-1,5,9-cyclododecatriene to obtain said isomers A and B. Thus, it is within the scope of the present invention to use said isomers A and B as starting materials for the preparation of 3-methylbenzosuberane and 4-methylbenzosuberane, regardless of which form of 1,5,9-cyclododecatriene said isomers were prepared from.

Also, while the present invention has been described as a dehydrogenation and isomerization process because it is evident that both dehydrogenation and isomerization do occur, this description should not be taken to imply any particular sequence for the dehydrogenation and isomerization reactions. It is not presently known which of said reactions occurs first, or if said reactions take place simultaneously or concomitantly. It is therefore not intended to limit the present invention to any particular sequence of said reactions.

Although the process of the present invention has been described in terms of batch or semi-continuous operations, it will be apparent to those skilled in the art that a continuous system can be employed without deviating from the inventive concept disclosed herein.

While certain embodiments of the invention have been described for illustrative purposes, the invention obviously is not limited thereto. Various other modifications will be apparent to those skilled in the art in view of the above disclosure. Such modifications are within the spirit and scope of the invention.

We claim:
1. A process for the preparation of methylbenzosuberane, which process comprises: subjecting a bicyclododecadiene hydrocarbon having an empirical formula of $C_{12}H_{18}$ to dehydrogenation and isomerization conditions in a reaction zone in the presence of a dehydrogenation and isomerization catalyst; and recovering said methylbenzosuberane from the effluent from said reaction zone.

2. A process according to claim 1 wherein said methylbenzosuberane is 3-methylbenzosuberane.

3. A process according to claim 1 wherein said methylbenzosuberane is 4-methylbenzosuberane.

4. A process according to claim 1 wherein said bicyclododecadiene hydrocarbon is selected from the group consisting of bicyclo-[5.5.0]-1,7-dodecadiene; bicyclo-[5.5.0]-$\Delta^{1,7}$,2-dodecadiene, and mixtures thereof.

5. A process according to claim 4 wherein said methylbenzosuberane is 3-methylbenzosuberane.

6. A process according to claim 4 wherein said methylbenzosuberane is 4-methylbenzosuberane.

7. A process for the dehydrogenation and isomerization of a bicyclododecadiene hydrocarbon having an empirical formula of $C_{12}H_{18}$ to methylbenzosuberane having an empirical formula of $C_{12}H_{16}$, which process comprises: contacting said bicyclododecadiene with a dehydrogenation and isomerization catalyst in a reaction zone under dehydrogenation and isomerization conditions; and recovering said methylbenzosuberane from the effluent from said reaction zone.

8. A process for the dehydrogenation and isomerization of a bicyclododecadiene starting material selected from the group consisting of bicyclo-[5.5.0]-1,7-dodecadiene, bicyclo-[5.5.0]-$\Delta^{1,7}$,2-dodecadiene, and mixtures thereof to a methylbenzosuberane product selected from the group consisting of 3-methylbenzosuberane, 4-methylbenzosuberane, and mixtures thereof, which process comprises: contacting said bicyclododecadiene starting material with a dehydrogenation and isomerization catalyst in a reaction zone at a temperature within the range of from 750 to 1300° F., a pressure within the range of from 0 to 50 p.s.i.g., and a space velocity within the range of 0.1 to 10 liquid volumes per volume of catalyst per hour; and recovering said methylbenzosuberane product from the effluent from said reaction zone.

9. A process according to claim 8 wherein said starting material is bicyclo-[5.5.0]-1,7-dodecadiene.

10. A process according to claim 8 wherein said starting material is bicyclo-[5.5.0]-$\Delta^{1,7}$,2-dodecadiene.

11. A process according to claim 8 wherein said starting material is a mixture of bicyclo-[5.5.0]-1,7-dodecadiene and bicyclo-[5.5.0]-$\Delta^{1,7}$,2-dodecadiene.

12. A process according to claim 8 wherein said product is 3-methylbenzosuberane.

13. A process according to claim 8 wherein said product is 4-methylbenzosuberane.

14. A process according to claim 8 wherein said product is a mixture of 3-methylbenzosuberane and 4-methylbenzosuberane.

15. A process according to claim 8 wherein said catalyst is a chromia-alumina catalyst.

No references cited.